March 3, 1953 E. H. ARMSTRONG 2,630,497

FREQUENCY MODULATION MULTIPLEX SYSTEM

Filed June 1, 1949 4 Sheets-Sheet 1

INVENTOR.
Edwin H. Armstrong

BY

Moser, Nolte, Crews & Berry
ATTORNEYS

INVENTOR.
Edwin H. Armstrong
BY
Moses, Nolte, Crews + Berry
ATTORNEYS

INVENTOR.
Edwin H. Armstrong
BY
Moses, Nolte, Crews & Berry
ATTORNEYS

INVENTOR.
Edwin H. Armstrong
BY
Moses, Nolte, Crews & Berry
ATTORNEYS

UNITED STATES PATENT OFFICE 2,630,497

FREQUENCY MODULATION MULTIPLEX SYSTEM

Edwin H. Armstrong, New York, N. Y.

Application June 1, 1949, Serial No. 96,605

9 Claims. (Cl. 179—15)

This invention relates to improvements in frequency modulation multiplex systems.

The object of the invention is to reduce interaction between channels in a frequency modulation multiplex system, whereby more channels may be effectively operated and whereby a higher signal to noise ratio may be obtained. A further object of the invention is to provide simpler means for accomplishing multiplex operation than has heretofore been possible.

Figure 1:
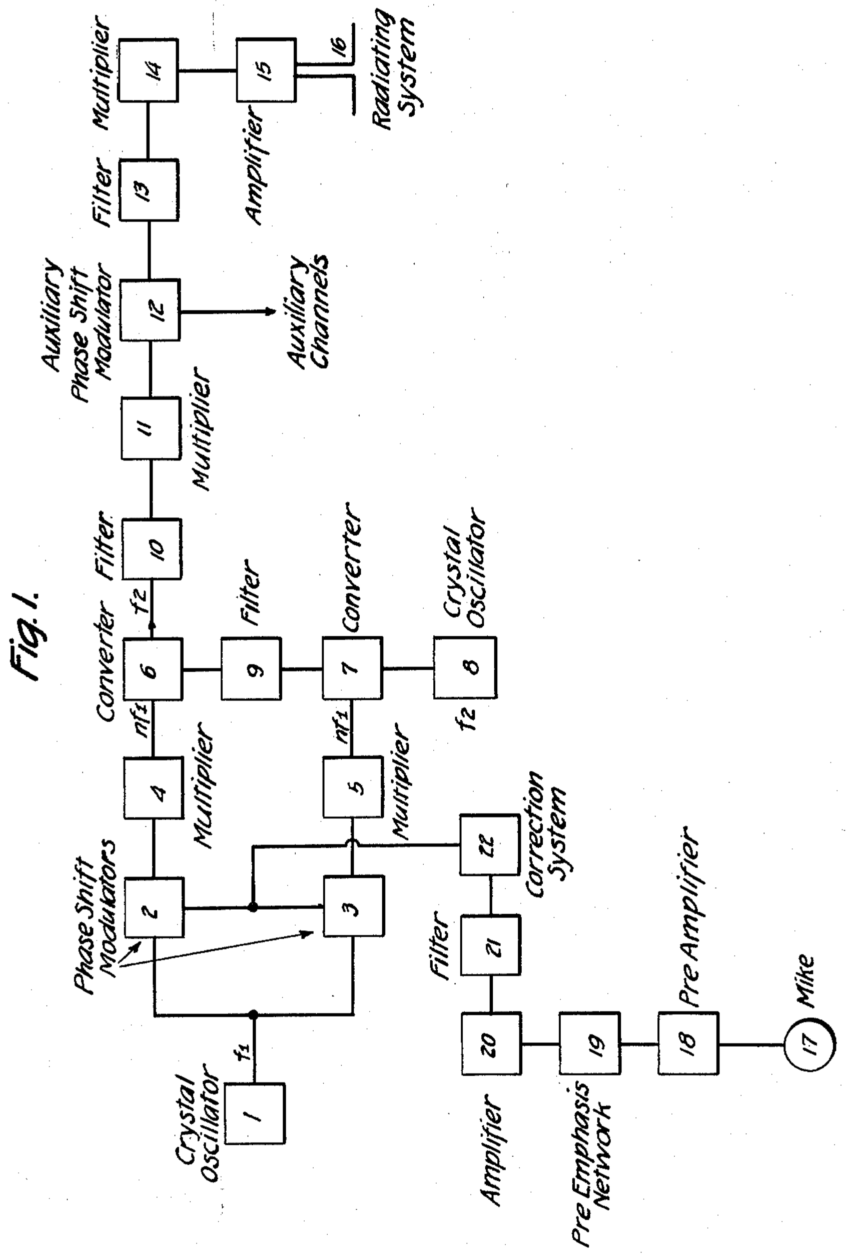
Figure 2:
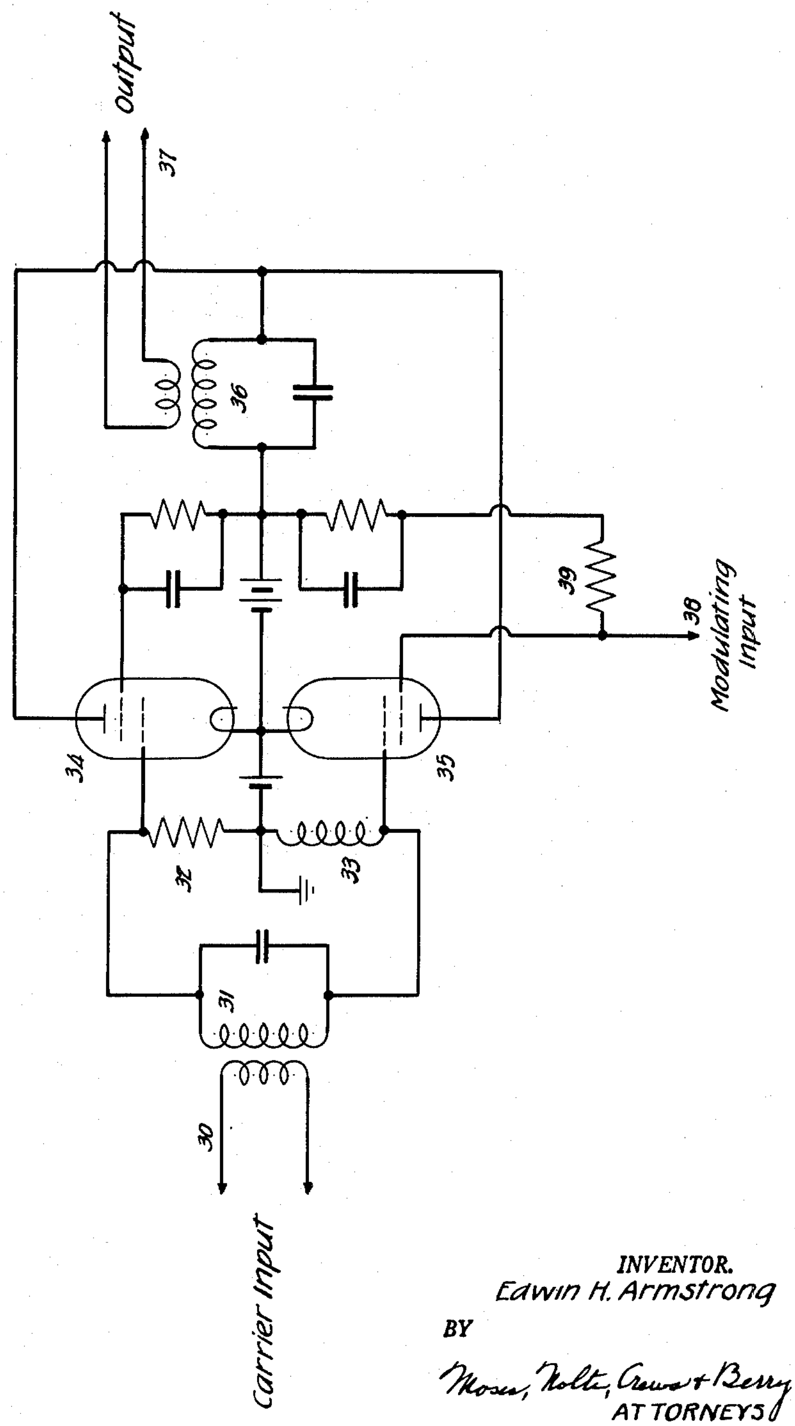
Figures 3, 4:
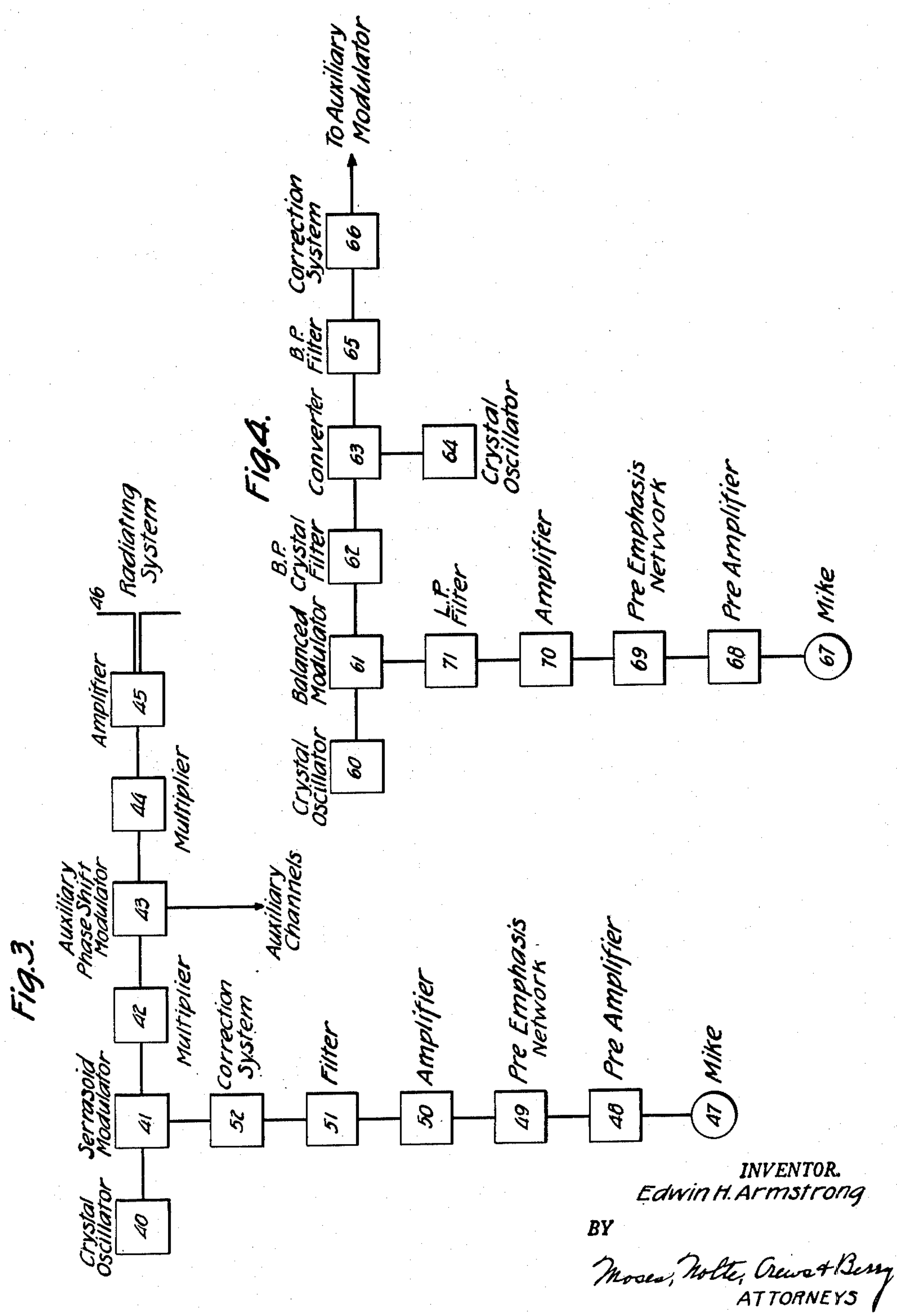
Figure 5:
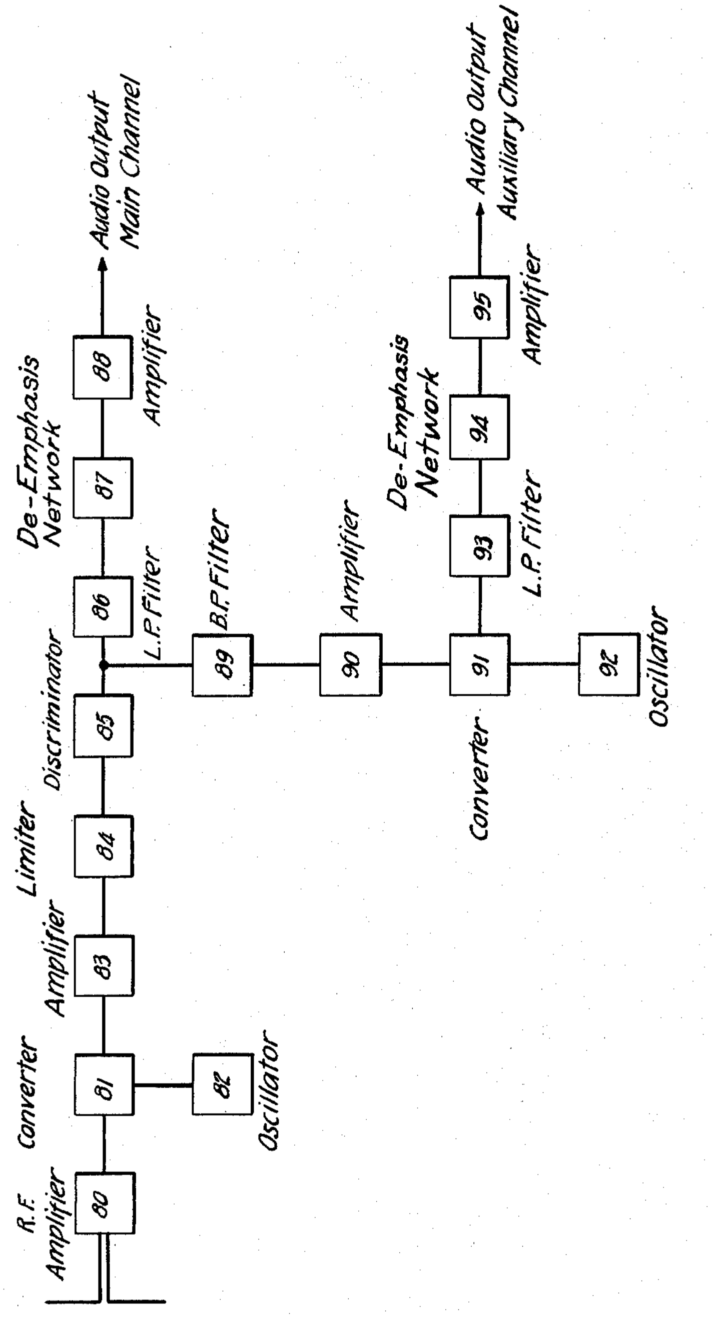

Referring now to the figures which form a part of this specification, Figure 1 illustrates the general arrangement of the multiplexing system used at the transmitter. Figure 2 illustrates the details of the arrangement whereby the multiplexed channels may be superimposed on the basic frequency modulation transmitter. Figure 3 illustrates a simplified form of a frequency modulation multiplex system as will be hereinafter explained. Figure 4 illustrates an arrangement for obtaining one or more of the auxiliary channels to be multiplexed on the basic transmission system, and Figure 5 illustrates an arrangement for receiving the main and the auxiliary channels transmitted by the arrangements of either Figure 1 or Figure 3.

Referring now specifically to Figure 1, there is illustrated a transmitter of the double channel phase shift type described in my U. S. Patent No. 2,290,159, which patent is an improvement on the method of transmission described in my U. S. Patent No. 1,941,068.

Referring now specifically to the elements of this transmitter, 1 represents a crystal oscillator having a frequency $f_1$ which supplies current to two identical paths 2, 4 and 6 and 3, 5 and 7, each containing the same number of frequency multiplications in the frequency multipliers 4 and 5 respectively. The outputs of the frequency multipliers deliver to each of the two frequency converters 6 and 7 currents having a frequency of $nf_1$. A second crystal oscillator 8 having a frequency $f_2$, which is a sub-multiple of the ultimate frequency which the transmitter is designed to emit, supplies current of frequency $f_2$ to the converter 7 to produce, among others, a difference frequency $nf_1-f_2$ which is selected by the filter 9 and combined with the current $nf_1$ in converter 6. The difference frequency is again selected by means of the filter 10 to recreate the frequency $f_2$, which is multiplied in a series of multipliers 11 and 14 to the desired output frequency, amplified by the power amplifier 15 and radiated from the antenna 16.

Modulation in the main channel is accomplished in the usual way by a modulation wave derived from the microphone 17 and transmitted through the system 18, 19, 20, 21 and 22, the corrected wave being applied to the phase shifting modulators 2 and 3 differentially; that is, the frequency on one side is increased by the phase shift, while on the other side it is being decreased, so that the frequency deviation at the output of converter 6 is double that of the deviation of either chain alone.

In the description up to this point the standard double channel modulator practice as used in simplex broadcast operation has been described. In my U. S. Patent 2,104,012 a system of multiplexing in which the auxiliary channels are fed into the main channel modulating system has been described. The present invention departs from that practice by the provision of an auxiliary phase shifting modulator 12 arranged to superimpose the auxiliary channels upon the transmitted wave at a point much closer to the final radiated frequency, so that the opportunities for cross-modulation between the channels, which is primarily brought about by the lack of linearity in the phase characteristics of the various circuits, is reduced to a minimum.

Because of the relatively high frequency of the auxiliary channels compared to the low tones of the musical range, a relatively small phase shift is required, so that the intermodulation products can be held to a very low value. This is particularly important because of the low initial distortion in the main modulating circuit of the double channel modulator.

An advantage in signal to noise ratio in the auxiliary channel is obtained by reason of the fact that the normal transmitter residual background noise which is present on the auxiliary channel when a single modulator is used for multiplex operation is kept out of the second channel by the frequency multiplier transformers which do not need to be widened beyond their normal value of twice the highest modulating frequency of the main channel. As a consequence of this, the auxiliary channels, which in the case of broadcast transmitters lie beyond the audible range, will not have their noise added to by the main oscillating and modulating system.

The precise point or frequency at which the auxiliary phase shifter may be most effectively introduced depends to a considerable extent upon the character of the main and auxiliary frequencies which are to be transmitted. In the present frequency modulation broadcast band, which is of the order of 100 megacycles, the auxiliary phase shifting system may be conveniently introduced at a point where the frequency has been multiplied up to the order of 2 megacycles.

Because of the relatively small phase shift required at this point, particularly where the auxiliary frequency is superaudible, a variety of different types of phase shifters may be effectively used. Figure 2 illustrates one arrangement. In this figure, 30—31 represents a tuned input circuit; 32—33 a phase-splitting means to apply voltages to the grids of the tubes 34—35 in quadrature, and 36—37 a common tuned output circuit for the two tubes.

The auxiliary modulating frequency may be impressed upon one of the tubes as shown through varying the potential of the screen grid of one of the tubes through the medium of the circuit 38—39. The resulting phase shift will be manifested in the output circuit in accordance with well known principles. If greater phase shifts than are indicated for the present system are required, a balanced modulator may be employed in accordance with known practice.

The advantages of the auxiliary system of modulation described in this specification are particularly applicable to a recent improvement made in the phase shift method of securing frequency modulation known as the Serrasoid described in the October 1948, issue of the periodical Electronics, published by McGraw Hill Publishing Co., New York, N. Y. This method of modulation permits of extremely low distortion components and the lowest value inherent background noise from the crystal and modulating parts of the system attained in any modulating system to date.

Figure 3 illustrates the manner of applying the auxiliary modulator to a Serrasoid system. Because of the large initial phase shift of this system, straight through frequency multiplication can be employed, and the beating back to a lower frequency as described in my U. S. Patent No. 2,290,159 is not required. As a consequence, the application of multiplexing to this system can be carried out with very simple apparatus.

In Figure 3, 40 represents the usual crystal oscillator; 41 the Serrasoid modulator; 42 a series of frequency multipliers including transformers (not shown) as described in my U. S. Patent No. 2,098,698 to bring the initial frequency—which is of the order of 100 kilocycles—up to the vicinity of 2 to 4 megacycles. 43 represents the auxiliary phase shifter, which may be of the type illustrated in Figure 2, and 44 represents additional frequency multiplication to bring the output of the phase shifter 43 up to the frequency which is to be radiated. 45 and 46 represent the usual power amplifier and radiating system. The main channel 47—52 may be the same as channel 17—22 of Figure 1. In accordance with standard design, the band widths of the transformers in the multiplier 42 are adjusted to pass twice the modulation frequency of the main channel and no more, so that an extremely low background noise ratio on the auxiliary channel is obtained.

While any system of suitable band width may be effectively multiplexed with the arrangements which have been described, a single side band type of system has certain advantages with respect to the division of the spectrum. An arrangement for applying this type of signal to the auxiliary channel is illustrated in Figure 4. The arrangement follows in general standard single side band practice in which crystal band pass filters are employed.

In Figure 4, 60 represents a crystal oscillator, 61 a balanced modulator of the amplitude modulating type, 62 a band pass crystal filter, 63 a converter, 64 a crystal oscillator for adjusting the frequency transmitted by the crystal filter, which is of the order of 100 kilocycles, down to a suitable value for multiplexing; 65 a filter to pass a band of any preselected width, having a mid point at 20 or 25 kilocycles; and 66 a correction system for adjusting the output signal level with respect to frequency to give a uniform frequency shift in the auxiliary modulator circuits. 67, 68, 69 and 70 represent the usual modulating system, with 71 a low pass filter to remove frequencies above the range of frequencies to be transmitted. This type of signal can be arranged to give any desired frequency swing on the auxiliary channel within the limitations of the band width in order to obtain the required signal to noise ratio on that channel.

Figure 5 illustrates an arrangement which may be conveniently used for the reception and separation of the main and auxiliary channels. 80—85 represents the standard FM receiver. The output of the discriminator for the main channel is separated by means of a low pass filter 86, the main channel including the usual restorer or deemphasis network 87 and audio amplifier 88. The output of the band pass filter 89 in the auxiliary channel is amplified by the amplifier 90, detected in the converter 91 by the insertion of the carrier from the oscillator 92. A low pass filter 93, restorer or deemphasis network 94 and an audio amplifier 95 completes the apparatus necessary to reproduce the original auxiliary signal.

Under certain conditions where more symmetrical detection is desired, the converter 91 may be a balanced converter, although in general this refinement will not be necessary. With the arrangements herein described it has been found possible to secure very high signal to noise ratios, together with substantial reduction in the cross-modulation products. It will be understood, of course, that while only one auxiliary channel is illustrated, that additional channels within the limitation of a band width may be added without departing from the spirit of the invention.

I have described what I believe to be the best embodiments of my invention. I do not wish, however, to be confined to the embodiments shown, but what I desire to cover by Letters Patent is set forth in the appended claims.

I claim:

1. A multiplex signal transmitter having a plurality of signal channels, a source of carrier waves, a main modulating means for frequency modulating the carrier wave from said source in accordance with signals in a first of said channels, an auxiliary modulating means connected to the output of said main modulating means for frequency modulating a carrier wave derived from said main modulating means in accordance with signals in a second of said channels, frequency multiplying means for multiplying the frequency of waves transmitted from said main modulating means to said auxiliary modulating means, and means connected to the output of said auxiliary modulating means for transmitting frequency modulated waves corresponding with signals in both of said channels.

2. A modulating system comprising a plurality of phase shifting modulators, each of said modulators having a carrier wave input circuit, a separate modulating wave input circuit, and an output circuit for the resulting modulated carrier waves; a separate signal channel for each of said modulating wave input circuits, the output circuit of a first of said modulators being connected to the carrier wave input circuit of a second of said modulators, and a frequency multiplier connected between said modulators for multiplying the frequency of waves transmitted from said first modulator to said second modulator.

3. A modulating system according to claim 2 which said second modulator has a relatively small phase shift response to a modulating signal of given strength as compared with said first modulator.

4. A system for reducing noise and interaction between signal channels in a frequency modulation multiplex transmitter, comprising means for frequency modulating waves from a carrier wave source in accordance with signal currents in a main channel, said means comprising a phase shift modulator, means for multiplying the frequency of the resulting wave to produce a wave of higher frequency, means for frequency modulating said higher frequency wave in accordance with signal currents in an auxiliary channel, said means comprising a phase shift modulator, and means for multiplying the frequency of the resulting wave to produce the desired output frequency.

5. A system for reducing noise and interaction between signal channels in a frequency modulation multiplex transmitter, comprising means for frequency modulating waves from a carrier wave source in accordance with signal currents in a main channel, said means comprising a phase shift modulator, means for multiplying the frequency of the resulting wave to produce a wave of higher frequency, means for eliminating from said wave all frequencies outside of the band necessary for transmitting the main channel modulations, means for frequency modulating said higher frequency wave in accordance with signal currents in an auxiliary channel, said means comprising a phase shift modulator, and means for multiplying the frequency of the resulting wave to produce the desired output frequency.

6. A system for reducing noise and interaction between a main channel and an auxiliary channel in a frequency modulation multiplex transmitter, comprising a main phase shift modulator means to frequency modulate waves from a carrier wave source in accordance with signal currents in the main channel, means to multiply the frequency of the resulting wave, means to supply to said auxiliary channel signal currents of a higher frequency than the signal currents in said main channel, auxiliary phase shift modulator means to modulate said wave of multiplied frequency in accordance with said signal currents of higher frequency in said auxiliary channel, and means to multiply the frequency of the resulting wave to produce the wave to be transmitted.

7. A system according to claim 6 in which said signal current supply means for said auxiliary channel includes means to produce a signal side band of a signal modulated carrier wave, and means to supply said side band as a modulating wave to said auxiliary phase shift modulator means, for modulating said wave of multiplied frequency.

8. A frequency modulation multiplex signal transmitting system having a low level of background noise and of cross-modulation, comprising a main modulating channel and an auxiliary modulating channel, a modulator for each of said channels, a first frequency multiplier for raising the frequency of the main channel at the output of the modulator thereof, said first multiplier including means to eliminate from the wave multiplied therein, frequencies lying outside of the band necessary for transmiting the main channel modulations, to thereby keep residual background noise of the main channel out of the auxiliary channel, means for feeding the output of the first frequency multiplier to the input of the auxiliary channel modulator, and a second frequency multiplier for multiplying the frequency of the compositely modulated wave produced in the modulator for the auxiliary channel, said auxiliary channel being superimposed on the main channel at a point so close to the final frequency to be transmitted that the opportunity for cross-modulation between the channels is reduced.

9. In a low noise level and low cross-modulation multiplex frequency modulation signal transmitting system, having a main channel and an auxiliary channel, and frequency modulators for said channels, the combination of a first frequency multiplier and a second frequency multiplier, said first multiplier being interposed at a point in the system between the modulator for the main channel and the modulator for the auxiliary channel, and having a band width limiting the frequency width of the main channel to reduce the noise in the auxiliary channel resulting from background noise in the main channel, said second multiplier being interposed subsequent to the auxiliary modulator at a point so close to the final frequency to be transmitted that the opportunity for cross-modulation between the channels is reduced.

EDWIN H. ARMSTRONG.

REFERENCES CITED

The following references are of record in the file of this patent:

UNITED STATES PATENTS

| Number | Name | Date |
|---|---|---|
| 1,861,462 | Trouant | June 7, 1932 |
| 2,407,308 | Lorenzen | Sept. 10, 1946 |
| 2,421,727 | Thompson | June 3, 1947 |
| 2,522,368 | Guanella | Sept. 19, 1950 |
| 2,523,222 | Marks | Sept. 19, 1950 |
| 2,583,484 | Guanella et al. | Jan. 22, 1952 |

FOREIGN PATENTS

| Number | Country | Date |
|---|---|---|
| 250,541 | Switzerland | June 16, 1945 |
| 489,716 | Great Britain | Aug. 2, 1938 |

OTHER REFERENCES

"A Method of Reducing Disturbances in Radio Signalling By a System of Frequency Modulation," Edwin H. Armstrong, reprinted from proceedings of the IAE, vol. 24, No. 5, May 1936.